United States Patent [19]

Hashimoto et al.

[11] Patent Number: 5,608,852
[45] Date of Patent: Mar. 4, 1997

[54] EVALUATION DATA DISPLAY DEVICES

[75] Inventors: Kayoko Hashimoto, Ome; Emiko Morooka, Fuchu; Fuminobu Nakamura, Kawasaki, all of Japan

[73] Assignee: Casio Computer Co., Ltd., Tokyo, Japan

[21] Appl. No.: 339,352

[22] Filed: Nov. 14, 1994

[30] Foreign Application Priority Data

Nov. 16, 1993 [JP] Japan .................................. 5-311225
Nov. 30, 1993 [JP] Japan .................................. 5-326241
Nov. 30, 1993 [JP] Japan .................................. 5-326242

[51] Int. Cl.$^6$ .................................................. G06F 15/00
[52] U.S. Cl. ................................................................ 395/135
[58] Field of Search ............................ 395/135, 155, 395/161; 345/113, 114

[56] References Cited

U.S. PATENT DOCUMENTS 5,375,195  12/1994  Johnston ................................ 395/135
5,404,426   4/1995  Usami et al. .......................... 395/120

*Primary Examiner*—Phu K. Nguyen
*Attorney, Agent, or Firm*—Frishauf, Holtz, Goodman, Langer & Chick

[57] ABSTRACT

An evaluation data display device for display of evaluation data corresponding to an image of an object such as an individual's face and body. Evaluation data corresponding to a combination of a face image designated from among a plurality of face images and a designated garment is read from an evaluation data storage on the basis of the designated face image and the designated garment. Any object image is designated from among a plurality of object images, and evaluation data corresponding to the designated object image is read from the evaluation data storage on the basis of the designated object image, and displayed. Evaluation data corresponding to a combination of a designated object image and a designated color is read from the evaluation data storage on the basis of the combination of the designated object image and color, and displayed.

16 Claims, 22 Drawing Sheets

FIG.4

| PART \ NO. | | 01 | 02 | | | 20 |
|---|---|---|---|---|---|---|
| CONTOUR | 1 | | | | | |
| HAIR STYLE | 2 | | | | | |
| EYES | 3 | | | | | |
| TOP | 4 | (BLOUSE) | (POLO SHIRT) | | | (Y-SHIRT) |
| BOTTOM | 5 | (SKIRT) | (JEANS) | | | (3-QUARTER) |
| NOSE | 6 | | | | | |
| BOTH LEGS | 10 | | | | | |

| KIND OF FACE \ KIND OF CLOTHING | TOP<br>POLO SHIRT (02) | BOTTOM<br>JEANS (02) | TOP<br>BLOUSE (01) | BOTTOM<br>3-QUARTER (20) |
|---|---|---|---|---|
| ROUND | CONTOUR (01) | THIS COMBINATION VERY WELL SUITS YOU WITH A ROUND FACE. | | THIS COMBINATION IS GOOD TO CREATE AROUND YOU A KINDLY ATMOSPHERE WHICH MATCHES WITH THE FEELING OF YOUR FACE. |
| SQUARE | CONTOUR (02) | THIS COMBINATION GREATLY IMPROVES THE IMAGE OF YOU WITH A SQUARE FACE. | | THIS COMBINATION GIVES YOUR SQUARE FACE A FEELING OF UNIQUE PERSONALITY. |
| TRIANGULAR | CONTOUR (03) | THIS COMBINATION SUITS YOU WITH A TRIANGULAR FACE. | | THIS COMBINATION SUITS YOU WITH A TRIANGULAR FACE. |

| DATA \ ITEM | INDIVIDUAL/FAMILY DATA 270 | | | | | | MONTAGE DATA 271 | | | | |
|---|---|---|---|---|---|---|---|---|---|---|---|
| | NAME | ADDRESS | TEL | AGE | HEIGHT | OTHER DATA | CONTOUR | HAIR STYLE | ... | TOP | BOTTOM |
| 1 | X | ○○○ | ○○○ | 30 | 170 | ○○○ | 01 | 20 | ... | 01 | 20 |
| | FAMILY 1 | — | — | 25 | 160 | ○○○ | 01 | 06 | ... | 06 | 05 |
| | FAMILY 2 | — | — | 3 | 100 | ○○○ | 05 | 04 | ... | 05 | 08 |
| | --- | --- | --- | --- | --- | --- | --- | --- | ... | --- | --- |
| 2 | Y | ○○○ | ○○○ | 40 | 160 | ○○○ | 05 | 04 | ... | 05 | 04 |
| | FAMILY 1 | — | — | 80 | 158 | ○○○ | 04 | 07 | ... | 06 | 07 |
| | FAMILY 2 | — | — | 90 | 100 | ○○○ | 05 | 04 | ... | 07 | 08 |
| | --- | --- | --- | --- | --- | --- | --- | --- | ... | --- | --- |

27 RAM

| TOTAL VALUE \ EVALUATION | FACE, BODY SHAPE IMAGE | BECOMING COLOR | ADVICE |
|---|---|---|---|
| 10~15 | SUPERROUND FACE SUPERFAT | BLACK | IF YOU WEAR BLACK GARMENT YOU LOOK THIN. PLEASE, TRY ! |
| 16~20 | SOMEWHAT ROUND FACE SOMEWHAT FAT | GRAY | GRAY GARMENT SUITS YOU. |
| ⋮ | ⋮ | ⋮ | ⋮ |
| 196~200 | SUPERTHIN FACE SUPERTHIN | WHITE | WHITE GARMENT IS GOOD TO GIVE YOU A FULL IMAGE ! |

| ITEM | DATA | INDIVIDUAL/FAMILY DATA ||||||| MONTAGE DATA |||||
|---|---|---|---|---|---|---|---|---|---|---|---|---|---|
| | NAME | ADDRESS | TEL | AGE | HEIGHT | OTHER DATA | ... | CONTOUR | HAIR STYLE | ... | BOTH LEGS | TOTAL VALUE |
| 1 | X | ooo | ooo | 30 | 170 | ooo | | 01 | 01 | | 01 | 11 |
| | FAMILY 1 | — | — | 25 | 160 | ooo | | 01 | 06 | | 06 | 15 |
| | FAMILY 2 | — | — | 3 | 100 | ooo | | 05 | 04 | | 05 | 13 |
| | ... | ... | ... | ... | ... | ... | | ... | ... | | ... | ... |
| 2 | Y | ooo | ooo | 40 | 160 | ooo | | 05 | 04 | | 05 | 20 |
| | FAMILY 1 | — | — | 80 | 158 | ooo | | 04 | 07 | | 06 | 50 |
| | FAMILY 2 | — | — | 90 | 100 | ooo | | 05 | 04 | | 07 | 43 |
| | ... | ... | ... | ... | ... | ... | | ... | ... | | ... | ... |

27A
270
271
RAM

| KIND OF COLOR (COLOR NO.) | KIND OF LIP (LIP PATTERN NO.) | 01 ROUND LIP | 02 POUTED LIP | 03 SQUARE LIP |
|---|---|---|---|---|
| 01 | RED | A:4 C:8<br>B:8 D:7 | A:4 C:6<br>B:9 D:5 | A:4 C:6<br>B:9 D:6 |
| 02 | PINK | A:8 C:9<br>B:5 D:6 | A:7 C:8<br>B:7 D:6 | A:4 C:7<br>B:8 D:3 |
| 03 | ROSE 1 | A:4 C:6<br>B:9 D:6 | A:4 C:7<br>B:8 D:3 | A:4 C:7<br>B:8 D:5 |
| 04 | ROSE 2 | A:7 C:10<br>B:8 D:7 | A:4 C:7<br>B:9 D:4 | | 
| 05 | PURPLE | A:1 C:2<br>B:6 D:9 | A:4 C:6<br>B:6 D:7 | |

DEGREE OF IMAGE
A: CUTE        C: ELEGANT
B: SPORTY   D: UNIQUE IN PERSONALITY

| KIND OF LIP (LIP PATTERN NO.) <br> KIND OF COLOR (COLOR NO.) | 01 <br> ROUND LIP | 02 <br> POUTED LIP | |
|---|---|---|---|
| 01 RED | COLOR ARRANGEMENT OF A NATURAL FEELING… | …IMAGINE A BROOK MURMURING IN A FOREST | |
| 02 PINK | NATURALNESS IS IMPRESSIVE… | GOOD TO GIVE A QUIET KINDLY FEELING TO… | |
| 03 ROSE 1 | SEA-IMAGINING… | …IMAGINING A LAKE | |
| 04 ROSE 2 | A TRAD IMAGE… | REFRESHED… | |
| 05 PURPLE | SLIGHTLY FEARLESS ADULT … | ⋮ | |

FIG.20

27B → RAM

| DATA \ ITEM | INDIVIDUAL/FAMILY DATA 270 | | | | | | MONTAGE DATA 271 | | | | | COLOR DATA 272 |
|---|---|---|---|---|---|---|---|---|---|---|---|---|
| | NAME | ADDRESS | TEL | AGE | HEIGHT | OTHER DATA | CONTOUR | HAIR STYLE | NOSE | LIP | COLOR NO. |
| 1 | X | ooo | ooo | 30 | 170 | ooo | 01 | 01 | 01 | 01 | 02 |
|  | FAMILY 1 | — | — | 25 | 160 | ooo | 01 | 06 | 06 | 05 | 01 |
|  | FAMILY 2 | — | — | 3 | 100 | ooo | 05 | 04 | 05 | 04 | 03 |
|  | --- | --- | --- | --- | --- | --- | --- | --- | --- | --- | --- |
| 2 | Y | ooo | ooo | 40 | 160 | ooo | 05 | 04 | 05 | 05 | 04 |
|  | FAMILY 1 | — | — | 80 | 158 | ooo | 04 | 07 | 06 | 03 | 08 |
|  | FAMILY 2 | — | — | 90 | 100 | ooo | 05 | 04 | 07 | 08 | 06 |
|  | --- | --- | --- | --- | --- | --- | --- | --- | --- | --- | --- |

EVALUATION DATA DISPLAY DEVICES

BACKGROUND OF THE INVENTION

The present invention relates to evaluation data display devices which display evaluation data corresponding to the image of an object such as an individual's face and/or body.

Recently, color information display devices have been proposed which display evaluation or advice data on a combination of colors on the basis of the combination of colors when same is designated. Thus, since the user can understand on the display screen of the color information display device an impression or an image which is made based on a combination of the colors of a top and a bottom which the user wears, the user can determine the colors of the top and bottom which the user wears when the user goes out, in light of the displayed evaluated or advice data.

Since those color information display devices only display data on evaluation or advice on a combination of colors, the user cannot know whether the impression which the user's face or whole body makes matches with the top and bottom which the user actually wears, or what the impression of a combination of the user's face and the top and bottom which the user wears is like. In addition, the user cannot know what color matches with the user's face or whole body on the basis of the impression or image of the shapes of the user's face and whole body.

It is therefore an object of the present invention to provide an evaluation data display device in which the user can rapidly and surely know whether the impression of the user's face matches with the kind of a top and a bottom which the user wears, or what an impression of a combination of the user's face and an impression or image which the kinds of a top and a bottom which the user wears is like.

It is another object of the present invention to provide an evaluation data display device in which the user can rapidly and surely know evaluation data on a color desirable or undesirable for the shape of the user's face or whole body on the basis of the impression of the shape of the user's face or whole body.

It is still another object of the present invention to provide an evaluation data display device in which the user can rapidly and surely know evaluation on whether a designated color and the images of objects such as the user's face and whole body provide a matching or preferable combination, or what impression they make in combination.

In order to achieve the above objects, the present invention provides an evaluation data display device comprising:

first designating means for designating one of a plurality of face images;

second designating means for designating the kind of a garment;

evaluation data storage means which stores a plurality of different evaluation data each on a combination of a face image and a garment;

reading means for reading evaluation data on a combination of the face image designated by the first designating means and the kind of a garment designated by the second designating means from the evaluation data storage means; and evaluation data display means for displaying the evaluation data read by the reading means.

According to the present invention, when the user designates one face image from among the plurality of face images with the first designating means and the kind of a garment which the user wears with the second designating means, the corresponding evaluation data is read from the evaluation data storage means on the basis of the combination of the designated face image and kinds of the garment and is displayed on the evaluation data display means. Thus, the user can rapidly and surely know whether the impression of the user's face matches with the kind of the garment which the user wears, or what impression or image the combination of the impression of the user's face and the kind of that garment makes.

BRIEF DESCRIPTION OF THE DRAWINGS

FIG. 4 shows illustrative storage contents of data on the part patterns in a part pattern ROM of the first embodiment;

FIG. 5 shows illustrative storage contents of evaluation data in an evaluation data ROM of the first embodiment;

FIG. 14 shows illustrative storage contents of evaluation data in an evaluation data ROM of a second embodiment of the present invention;

FIG. 18 shows illustrative storage contents of evaluation data in an evaluation data ROM in a third embodiment of the present invention;

FIG. 19 shows illustrative storage contents of evaluation data in an advice data ROM of the third embodiment;

FIG. 20 shows illustrative storage contents of data in a RAM of the third embodiment;

DESCRIPTION OF THE PREFERRED EMBODIMENTS

Embodiments of the present invention will be described below with respect to the drawings.

[First Embodiment]

Figure 1:
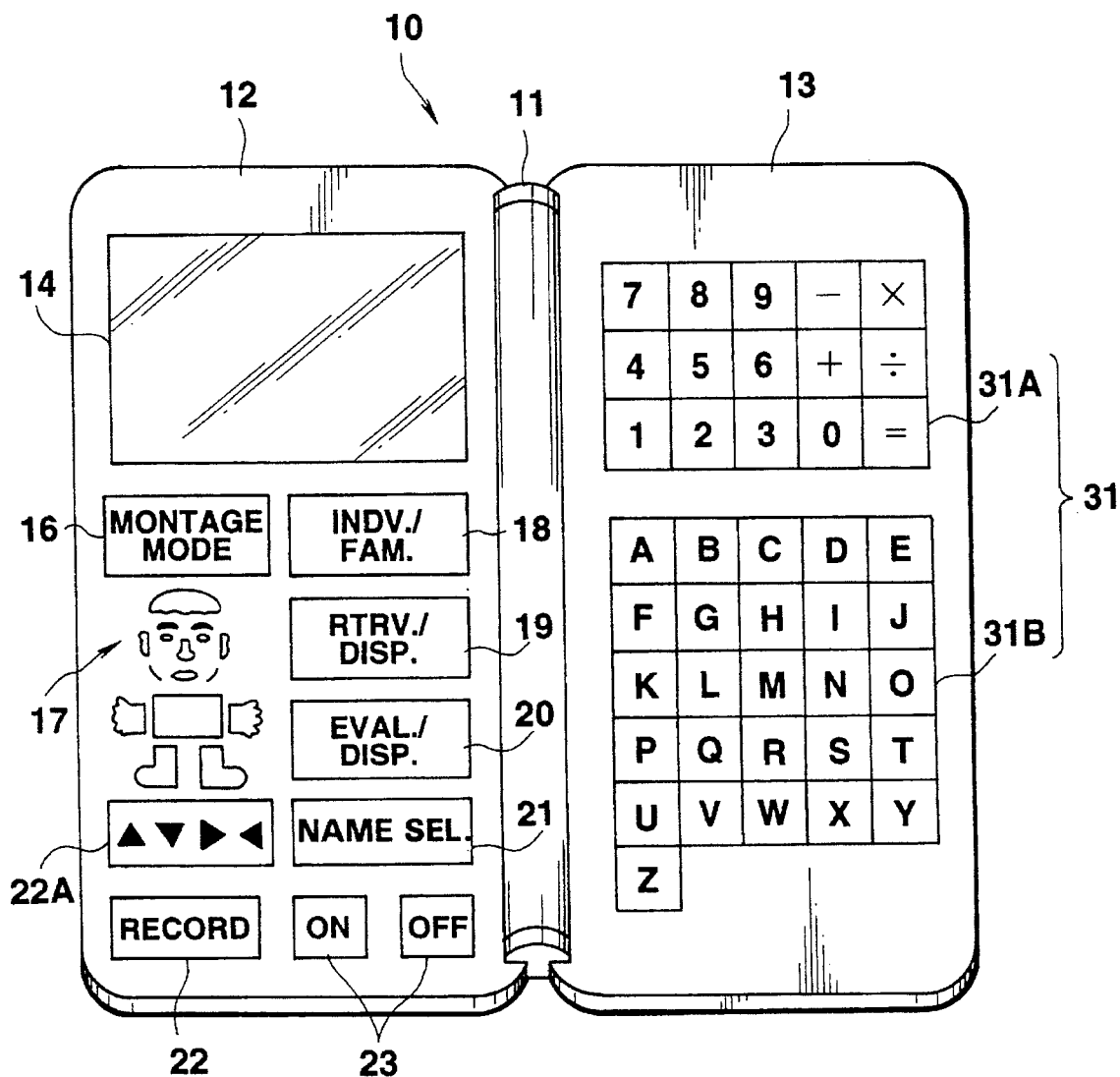
FIG. 1 shows the appearance of an evaluation data display device of a first embodiment of the present invention.

FIG. 1 shows the appearance of an evaluation data display device of one embodiment of the present invention. In FIG. 1, the evaluation data display device 10 has a display/input panel 12 and an input panel 13 connected openably and closeably through a hinge 11. The display/input panel 12 and the input panel 13 include a display 14 and a key-in unit 15.

The key-in unit 15 includes a montage mode key 16, a montage data input unit 17, an individual/family data mode key 18, a montage retrieval/display mode 19, an evaluation display mode key 20, a recording key 22, a cursor key 22A, a power supply on/off key 23, and an individual data key-in unit 31.

The montage mode key 16 is used to set a montage mode. The montage data input key 17 is operated to create a montage in the montage mode set by the montage mode key 16. The individual/family data mode key 18 is used to set a mode in which individual/its family data such as the name and telephone number of a montage image is keyed in. The montage retrieval/display mode key 19 is used to set a mode in which montage data and individual data are retrieved/displayed. The evaluation display mode key 20 is used to set a mode in which evaluation data is displayed. The recording key 22 is used when data is recorded. The power supply on/off key 23 is used to turn on/off the power supply (not shown).

The individual data key-in unit 31 includes a numerical key unit 31A and an alphabetical key 31B.

Figure 2:
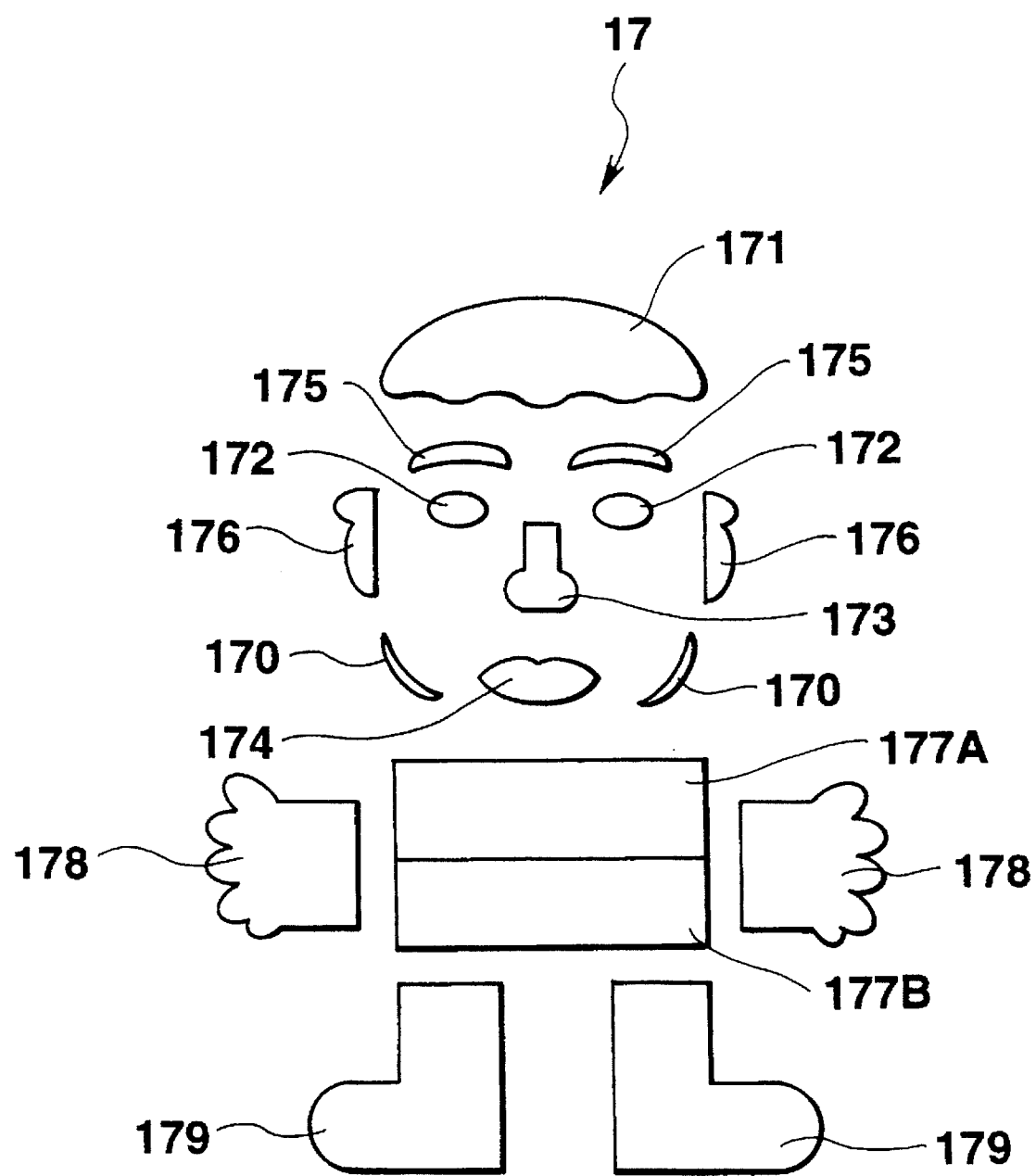
FIG. 2 is an enlarged plan view of a montage data input key.

As shown in FIG. 2, the montage data input key 17 is composed of a plurality of part keys each disposed at the position of a respective one of the parts which compose the whole body of a montage image. More specifically, the plurality of part keys is composed of a contour key 170, a hair style key 171, an eye key 172, a nose key 173, a mouth key 174, an eyebrow key 175, an ear key 176, a tops key 177A, a bottoms key 177B, a both-arm key 178, and a both-leg key 179.

Figure 3:
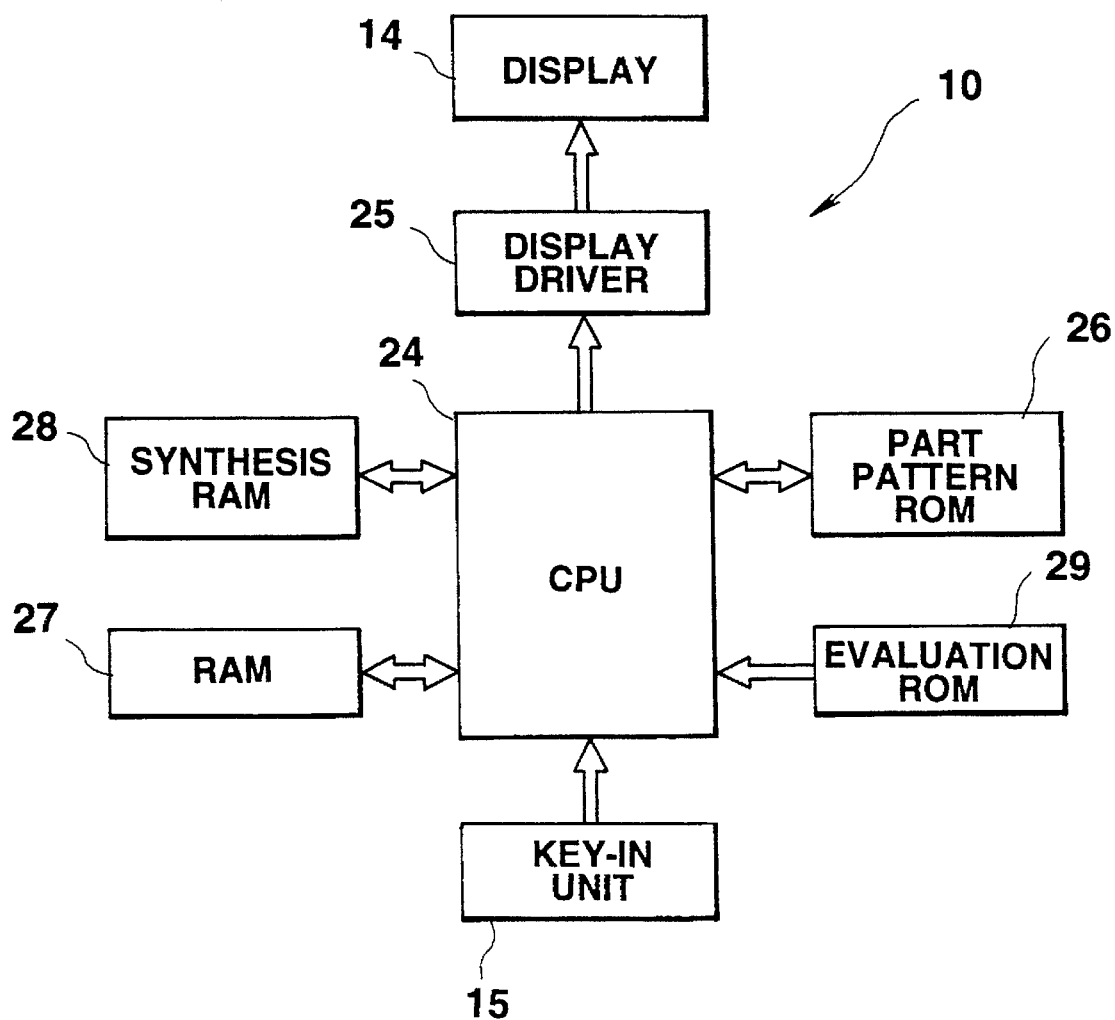
FIG. 3 is a whole block diagram indicative of the circuit structure of the evaluation data display device of the first embodiment.

FIG. 3 is a block diagram indicative of the circuit structure of the evaluation data display device of the first embodiment of the present invention. In FIG. 3, a CPU 24 which controls the respective elements of the evaluation data display device 10 is connected with the key-in unit 15, display 14, a display driver 25, a part pattern ROM 26, a RAM 27, a synthesis RAM 28 and an evaluation data ROM 29.

As shown in FIG. 4, the part pattern ROM 26 stores in the form of a bit map a plurality of sets of different shaped part patterns, one set for each of the parts of the whole body which are a contour, a hair style, eyes, a top, a bottom, a nose, a mouth, both arms, and both legs of an image.

For example, a part pattern location "1" for "contour" stores data on different shaped contour patterns with the corresponding pattern numbers "01"–"20". A part pattern location "2" for "hair style" stores data on different shaped hair style patterns with the corresponding pattern numbers "01"–"20". Similarly, part pattern locations for "eyes", "tops", "bottoms", "nose", ... "both legs" each store data on corresponding different shaped part patterns with the corresponding pattern numbers "01"–"20".

In the storage area for the part patterns of the "top", a part pattern location "01" stores data on the pattern of a "blouse"; a part pattern location "02" stores data on the pattern of a "polo shirt"; ... a part pattern location "20" stores data on the pattern of a "T-shirt".

Similarly, in the storage area for the part patterns of the "bottom", a part pattern location "01" stores data on the pattern of a "skirt"; a part pattern location "02" stores data on the part pattern of "jeans"; ... a part pattern location "20" stores data on the part pattern of a "three-quarter-length".

As shown in FIG. 5, the evaluation data ROM 29 stores evaluation data on a combination of the kind of a face and the kind of a garment (a top and a bottom).

The evaluation data is created on the basis of empiric rules "A looking-thin garment becomes a round face" and "A somewhat rounded garment becomes a square face", and so on.

The "kind of a face" in the evaluation data ROM 29 is, for example, round, square or triangular. In this case, the kind of a face corresponds to the kind of its contour. More particularly, for example, a round face corresponds to a part pattern (No. "01") of the contour of that face. A square face corresponds to a part pattern (No. "02") of the contour of that face. A triangular face corresponds to a part pattern (No. "03") of the contour of that face.

The "kind of a garment" in the evaluation data ROM 29 is, for example, for a plurality of combinations of a top and a bottom. For example, a top "polo shirt" (its part pattern No. "02") is combined with a bottom "jeans" (its part pattern No. "02"). A top "blouse" (its part pattern No. "01") is combined with a bottom "three-quarter-length" (its part pattern No. "20").

When (1) the kind of a face is "round", (2) the top is "polo shirt", and (3) the bottom is "jeans", the corresponding evaluation data on the impression which a combination of the "polo shirt" and "jeans" for that round face makes is that [The combination of the "polo shirt" and "jeans" very well becomes you who has a round face]. When (1) the kind of a face is "round", (2) the top is "blouse", and (3) the bottom is "three-quarter-length", the corresponding evaluation data on the impression which the "blouse" and the "three-quarter-length" for that round face make is that [The combination of the "blouse" and the "three-quarter-length" is good to create around you a kindly atmosphere which matches well with the feeling of that face].

Figure 6:
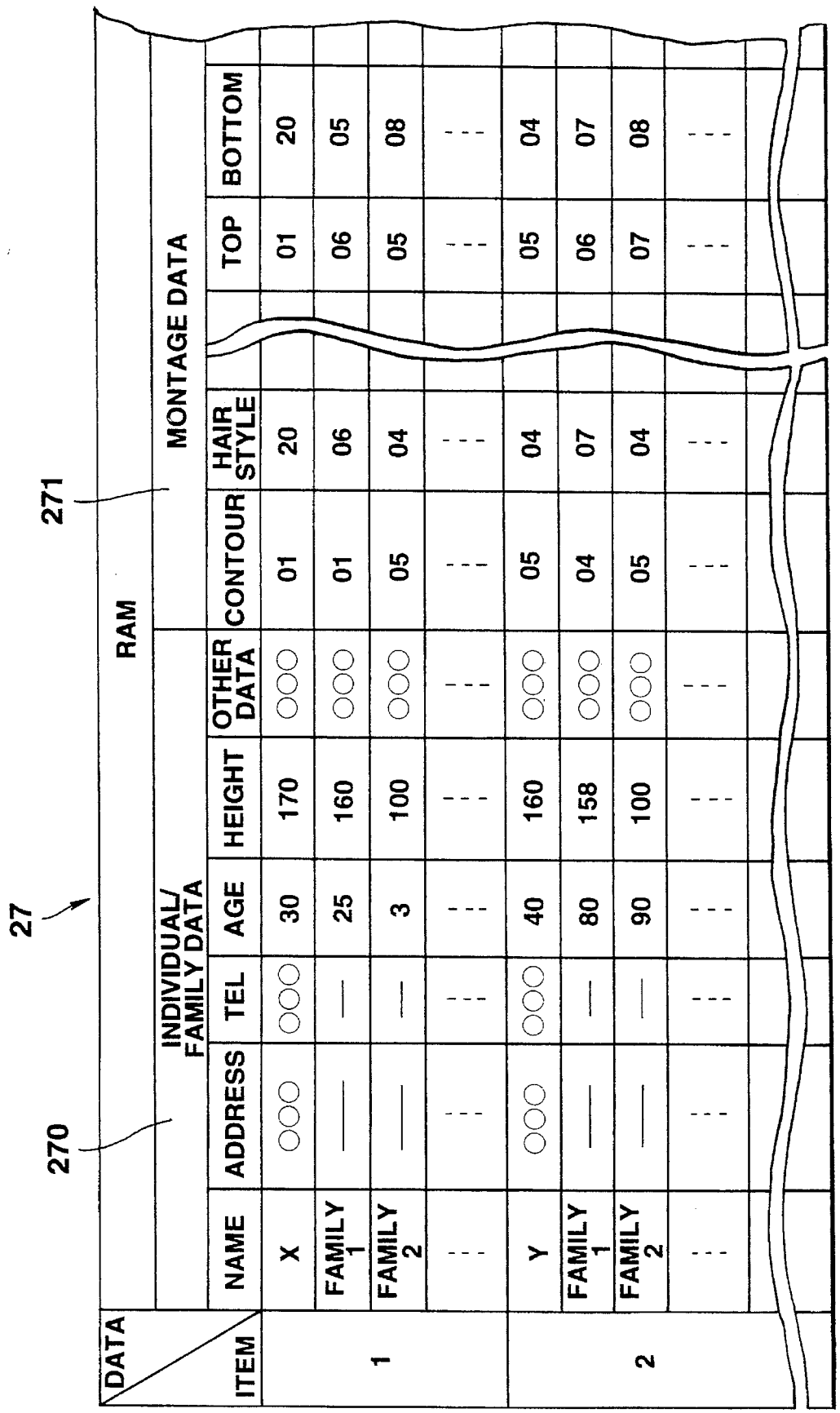
FIG. 6 shows illustrative storage contents of data in a RAM of the first embodiment.

As shown in FIG. 6, the RAM 27 stores individual data and family data keyed in by the operation of the individual data input key 31 of the key-in unit 15; and montage data keyed in by the operation of the montage data input key 17. In this case, the individual data relates to data on the individual's name, address, telephone number, age, height and other data including data on interests. The "family data" relates to data on the family member's name, address, telephone number, age, height and other data including data on interests. The "montage data" keyed in by the operation of the montage data input key 17 relates to the pattern Nos. of the parts which compose the created montage image.

The synthesis RAM 28 combines patterns of the respective parts of the created montage including a contour, hair style, eyes, a top, and a bottom, etc., displayed on the display 14. The RAM 28 temporarily stores data on the part patterns read from the part pattern ROM 26.

The display 14 comprises for example, a liquid crystal dot matrix display which displays through the display driver 25 individual data such as its face and whole body data combined in the synthesis RAM 28 on the basis of that individual data.

The operation of the evaluation data display device of the first embodiment of the present invention will be described with respect to the flowcharts of FIGS. 7–12.

Figure 7:
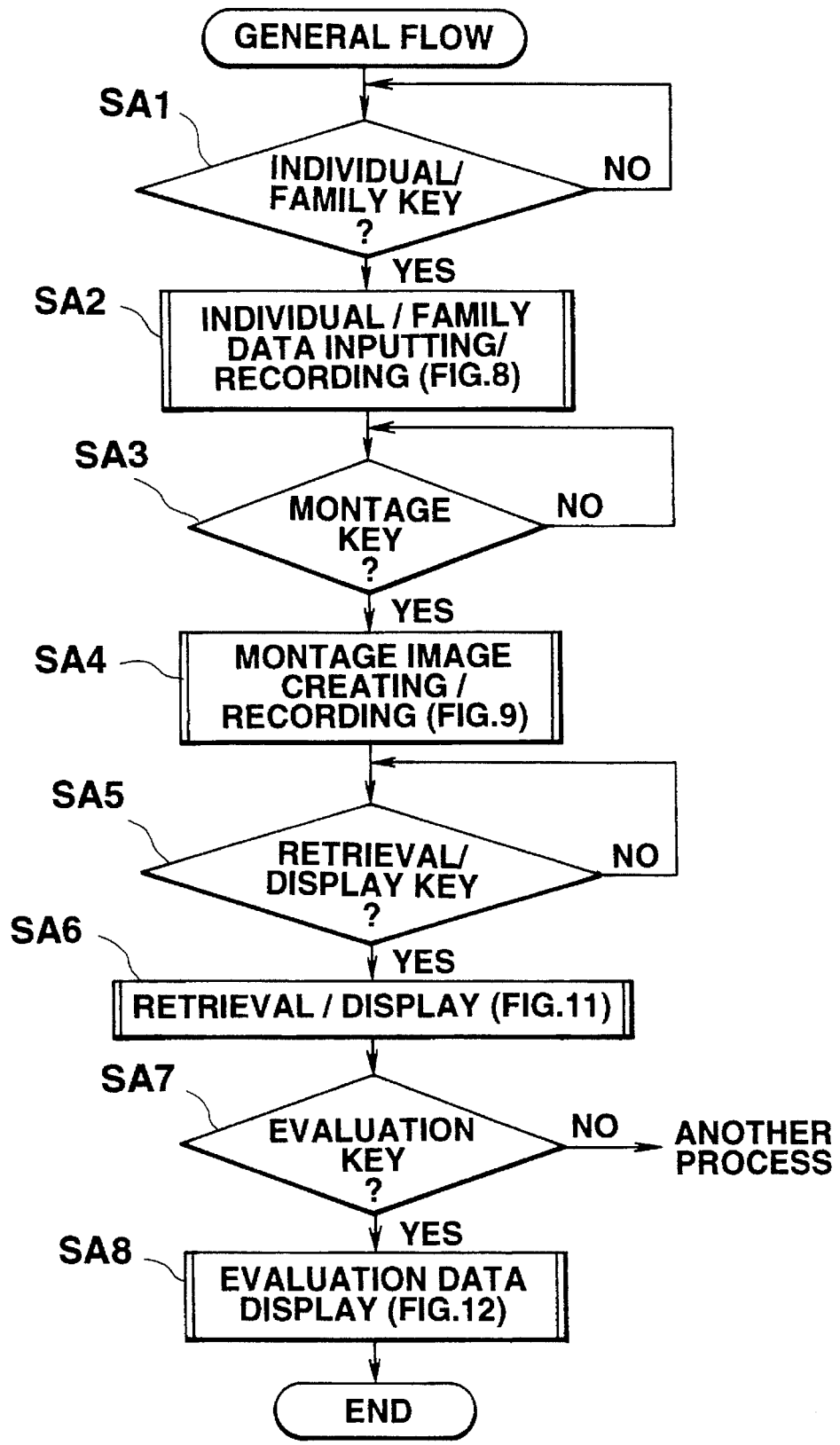
FIG. 7 is a general flowchart indicative of the operation of the first embodiment.
Figure 8:
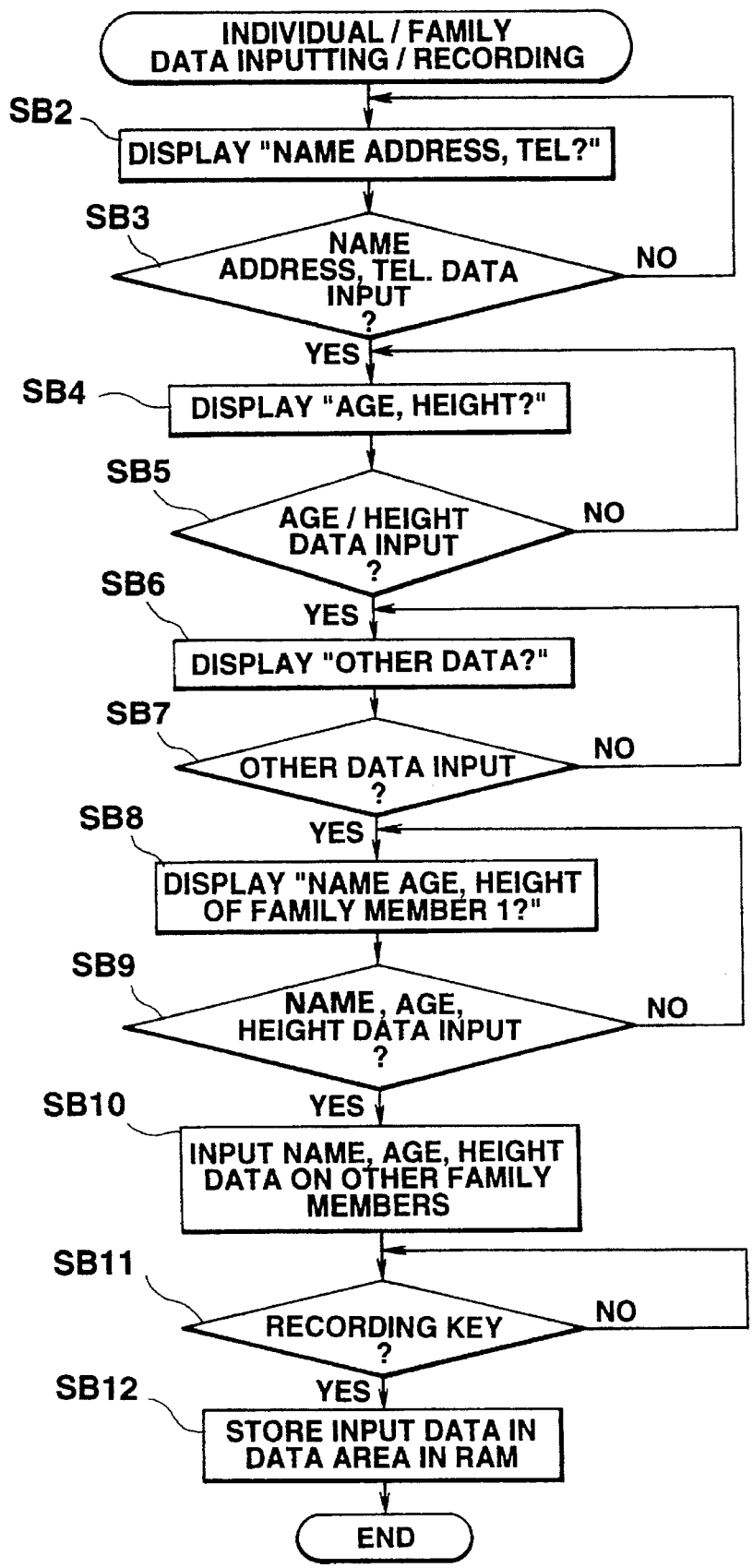
FIG. 8 is a flowchart indicative of an individual/family data inputting/recording process.

First, a general flow of FIG. 7 indicative of the operation of the evaluation data display device will be described. First, at step SA1 it is determined whether the individual/family data mode key 18 has been operated. If so, an input mode where individual/family data is keyed in is set. At step SA2 individual/family data inputting/recording process (FIG. 8) is performed in that mode.

At step SA3 it is determined whether the montage mode key 16 has been operated. If so, at step SA4 a montage creation mode is set, where montage image creating and recording process (FIGS. 9, 10) is performed.

Figure 11:
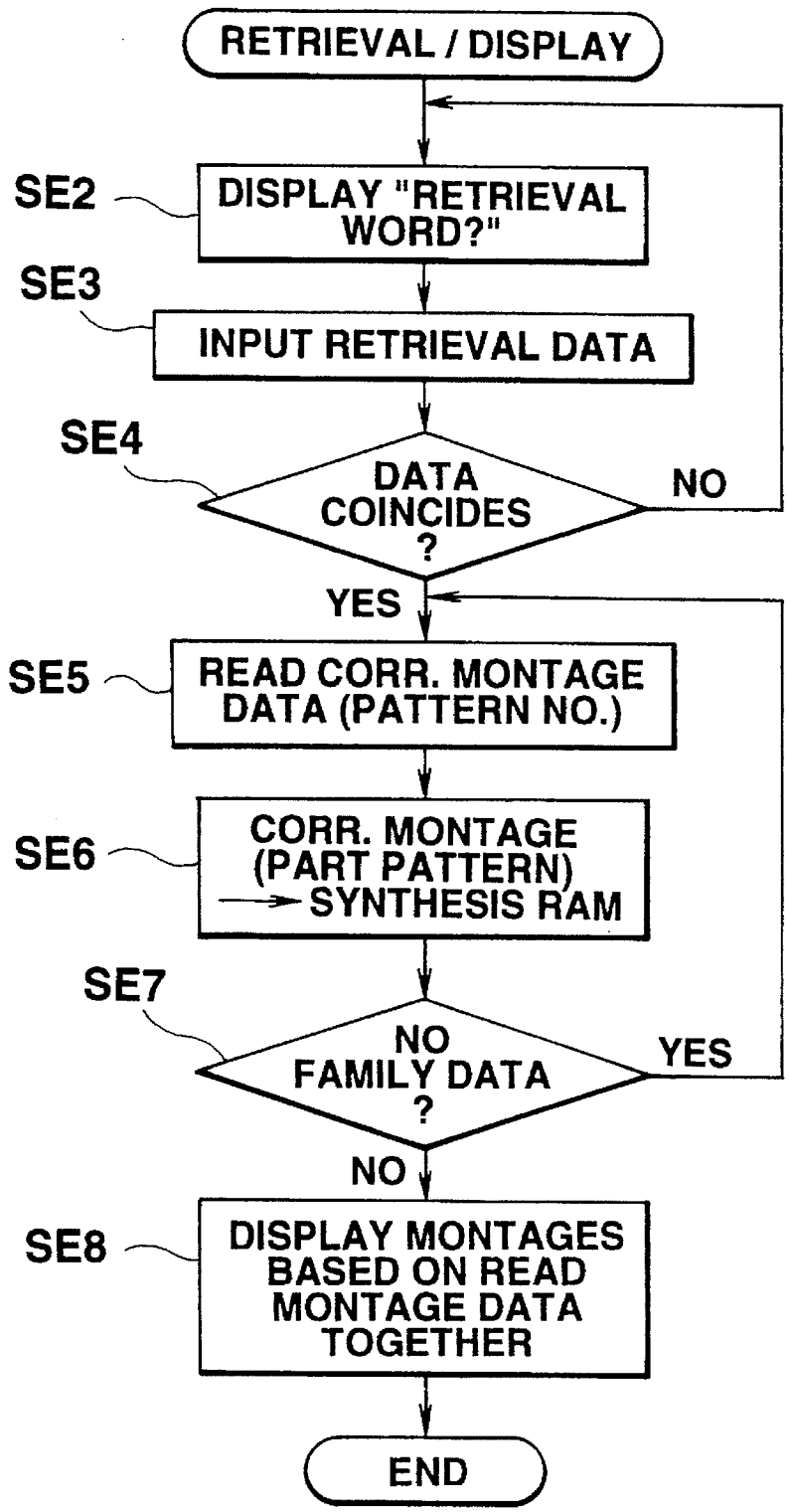
FIG. 11 is a flowchart indicative of a montage image retrieval/display process.

Subsequently, at step SA5 it is determined whether the montage retrieval/display mode key 19 has been operated. If so, a montage retrieval/display mode for the individual/family data is set. At step SA6, the montage retrieval/display process for the individual/family data is performed in that mode (FIG. 11).

Finally, at step SA7 it is determined whether the evaluation display mode key 20 has been operated. If so, an evaluation display mode is set, and an evaluation data display process where montage image and evaluation data are displayed is performed at step SA8 (FIG. 11). If a key different from the evaluation display mode key 20 is operated, the corresponding "other process" is executed.

The respective processes of the general flowchart of FIG. 7 will be described next. First, an individual/family data inputting/recording process of FIG. 8 will be described. This process is executed when the individual/family data mode key 18 is operated. When the key 18 is operated at step SB2, "A target individual's name, address and telephone number ?" is displayed on the display 14 to urge the user to key in those data. At step SB3 it is determined whether those data have been keyed in.

If so, at step SB4 "The individual's age and height ?" is displayed. At step SB5 it is determined whether those data have been input. If so, at step SB6 "Other data ?" is displayed. At step SB7 it is determined whether the other data has been input.

If so, at step SB8 "The name, age and height of a family member 1 ?" is displayed to urge the family member's data to be input. At step SB9 it is determined whether those data on the family member 1 have been input. If so, at step SB10 "Family data on family members 2, 3, . . . is input.

Thus, if all the individuals' data and their family data have been input, at step S11 it is determined whether the recording key 22 has been operated. If so, the data input so far is stored in the individual/family data area 270 of the RAM 27, as shown in FIG. 6, and the process is terminated, In this case, the individual data and its family data; the other individual data and other individual's family data; . . . stored in the individual/family data area 270 are separated for the corresponding item Nos. "1", "2", . . . .

Figure 9:
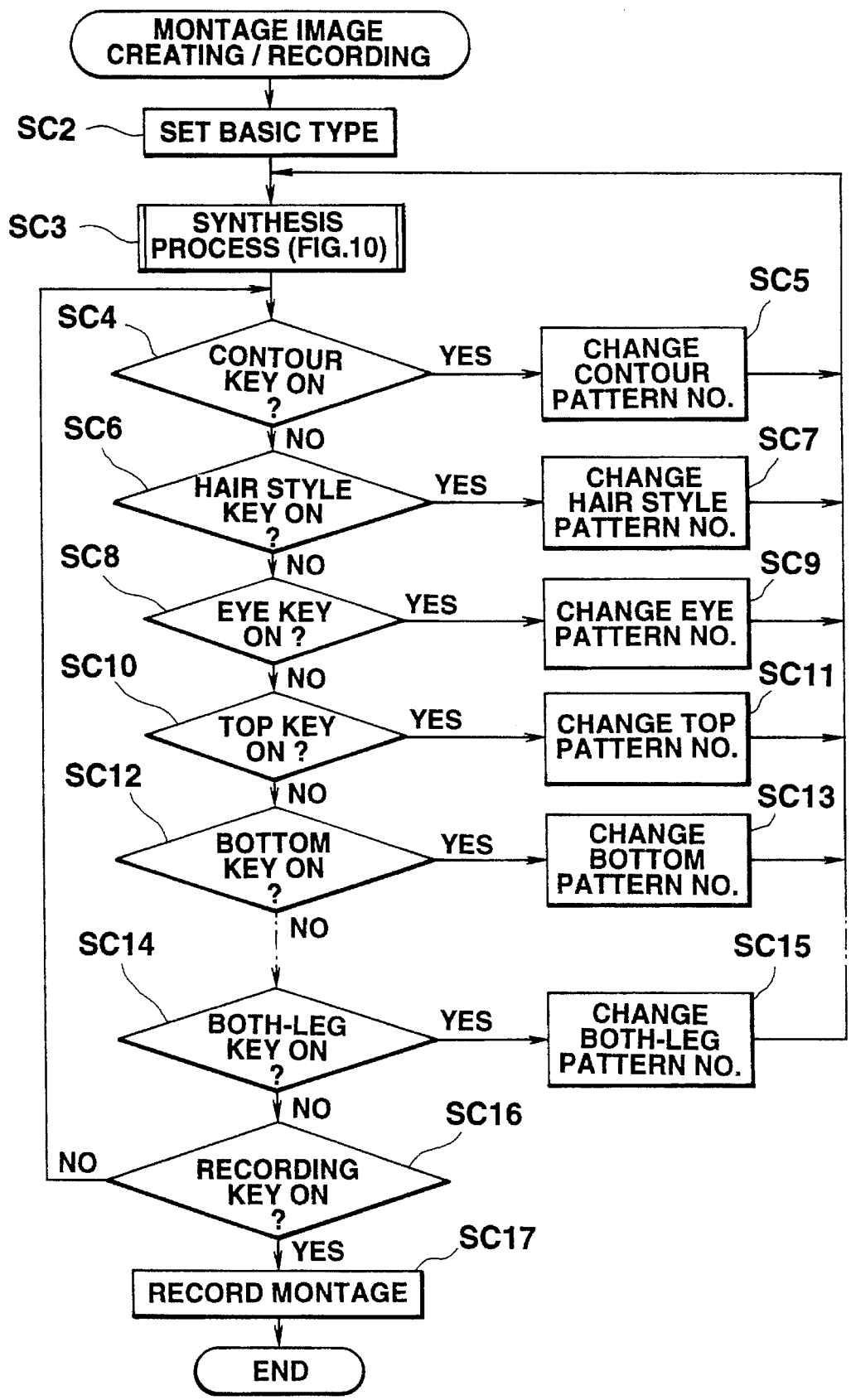
FIG. 9 is a flowchart indicative of a montage data creating/recording process.

The montage image creation/recording process will be described with respect to FIG. 9. In this process, first, at step SC2 predetermined basic type montage data (data on a combination of part pattern Nos.) is read and stored temporarily in a storage area (not shown) of the RAM 27.

Figure 10:
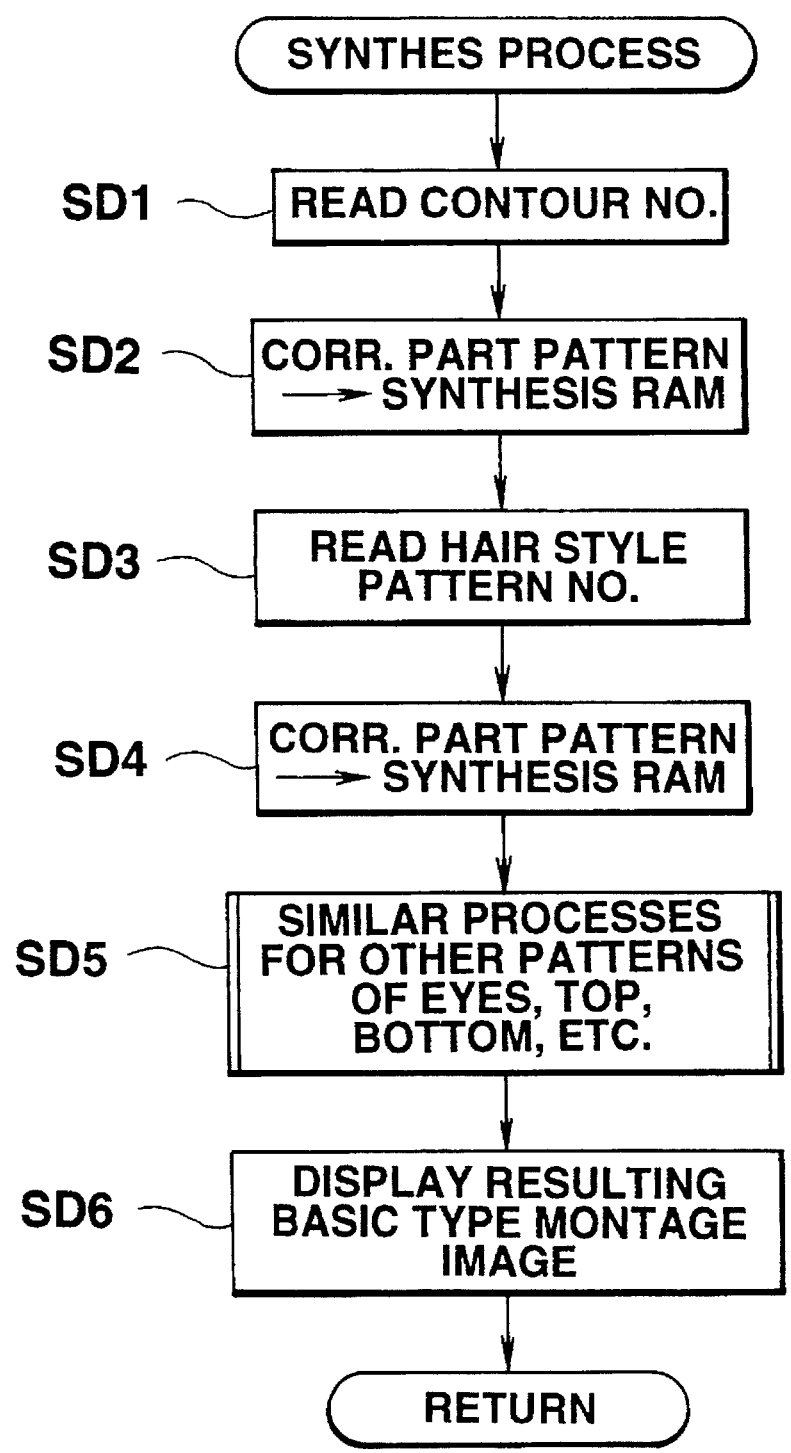
FIG. 10 is a flowchart indicative of a part pattern synthesis process.

At step SC3 data on the respective part patterns in the part pattern ROM 26 corresponding to those stored part pattern Nos. are synthesized in the synthesis RAM 28 in accordance with the flowchart of FIG. 10. More particularly, at step SD1 a contour pattern No. is first read from among the respective part pattern Nos. which compose montage data stored in RAM 27 in the above-mentioned manner. At step SD2 a contour pattern corresponding to the contour pattern No. is read from the ROM 26 and stored in a synthesis area in the synthesis RAM 28. At step SD3 a hair style pattern No. is read from the RAM 27, and at step SD4 a hair style pattern corresponding to its No. is read from the part pattern ROM 26 and stored in the synthesis area in the synthesis RAM 28. Further, at step SD5 similar processing is performed for the patterns of other parts including eyes, a top, a bottom, a nose, a mouth, both legs, etc. At step SD6 the montage data synthesized in the synthesis RAM 28 is delivered through the display driver 25 to the display 14 to thereby display a corresponding basic type montage image on the display 14 on the basis of the montage data.

The displayed basic type montage data is changeable, if necessary. First, at step SC4 it is determined whether the contour key 170 has been operated. If so, at step SC5 the current set part pattern No. is incremented by one and the resulting part pattern No. is stored at an "X"'s contour location in the RAM 27. At step SC3 a part pattern corresponding to the new part pattern No. is read from the part pattern ROM 26 and stored in the synthesis area of the synthesis RAM 28, where the new contour pattern is combined with the patterns of other parts such as the hair style, nose, . . . To this end, a montage image in which the current contour pattern alone is replaced with the new one is displayed on the display 14. Thus, each time the contour key 170 is operated, a montage image in which only the contour pattern so far combined is replaced with a new one is displayed on the display 14.

Similarly, at steps SC6–SC15 the hair style key 171, eye key 172, nose key 173, mouth key 174, eyebrow key 175, ear key 176, top key 177A, bottom key 177B, both-arm key 178, or both-leg key 179 are operated to change the current part pattern Nos. to new ones corresponding to part patterns similar to the hair style, eyes, nose, mouth, eyebrows, ears, top, bottom, both hands, or both legs of a human being.

After this changing operation has ended, the created and displayed montage image resembling the target face and body shape is confirmed on the display 14. After this confirmation, at step SC16 it is determined whether the recording key 22 has been operated. If so, at step SC17 the montage data (respective part pattern Nos.) corresponding to the confirmed montage image "X" is stored/recorded in the montage data area 271 for "X" in the RAM 27. In this way, the creation and recording of the montage image "X" is completed.

The montage data on the "X"'s family members is created in a manner similar to that of creation of the montage image "X" and stored sequentially in the respective storage areas for "family member 1", "family member 2", . . . . Thereafter, the montage data on other individuals "Y", "Z", . . . and data on their respective family members are created in a manner similar to that of creation of the montage image "X", and stored sequentially in the respective storage areas. In this way, the creation and recording of the respective montage data on the individuals and their family members is completed.

A montage retrieval/display process of FIG. 11 will be described. This process is performed after the montage retrieval/display mode is set by the montage retrieval/display mode key 19. When at step SA5 the montage retrieval/display mode key 19 has been operated, at step SE2 "A word to be retrieved ?" is displayed on the display 14 to thereby urge individual's data to be input for retrieval. If in response to that display a name such as "X" or "Y" is keyed in as data to be retrieved at step SE3, it is determined at step SE4 that the keyed-in retrieved data matches with individual's name data stored in the individual data area. If so, at step SE5 montage data (the respective part pattern Nos.) corresponding to the matching individual data is read from the montage data area 271 in the RAM 27; the corresponding part pattern data are read from the part pattern ROM 26; and the part patterns are synthesized in the synthesis RAM 28 at step SE6.

At step SE7 it is determined whether family data related to the individual data under retrieval at present is stored in the montage area 271 of the RAM 27. If so, at step SE8 montage data corresponding to the related family data is read from the montage area 271 of the RAM 27, the corresponding part patterns are read from the part pattern ROM 27 and synthesized in the synthesis RAM 28, as in the case of retrieval of the individual data. The resulting family member's montage image is displayed along with the synthesized individual's montage images on the display 14. Thus, when the individual data is retrieved, the individual's montage image as well as its family montage image(s) are displayed together on the display 14.

Figure 12:
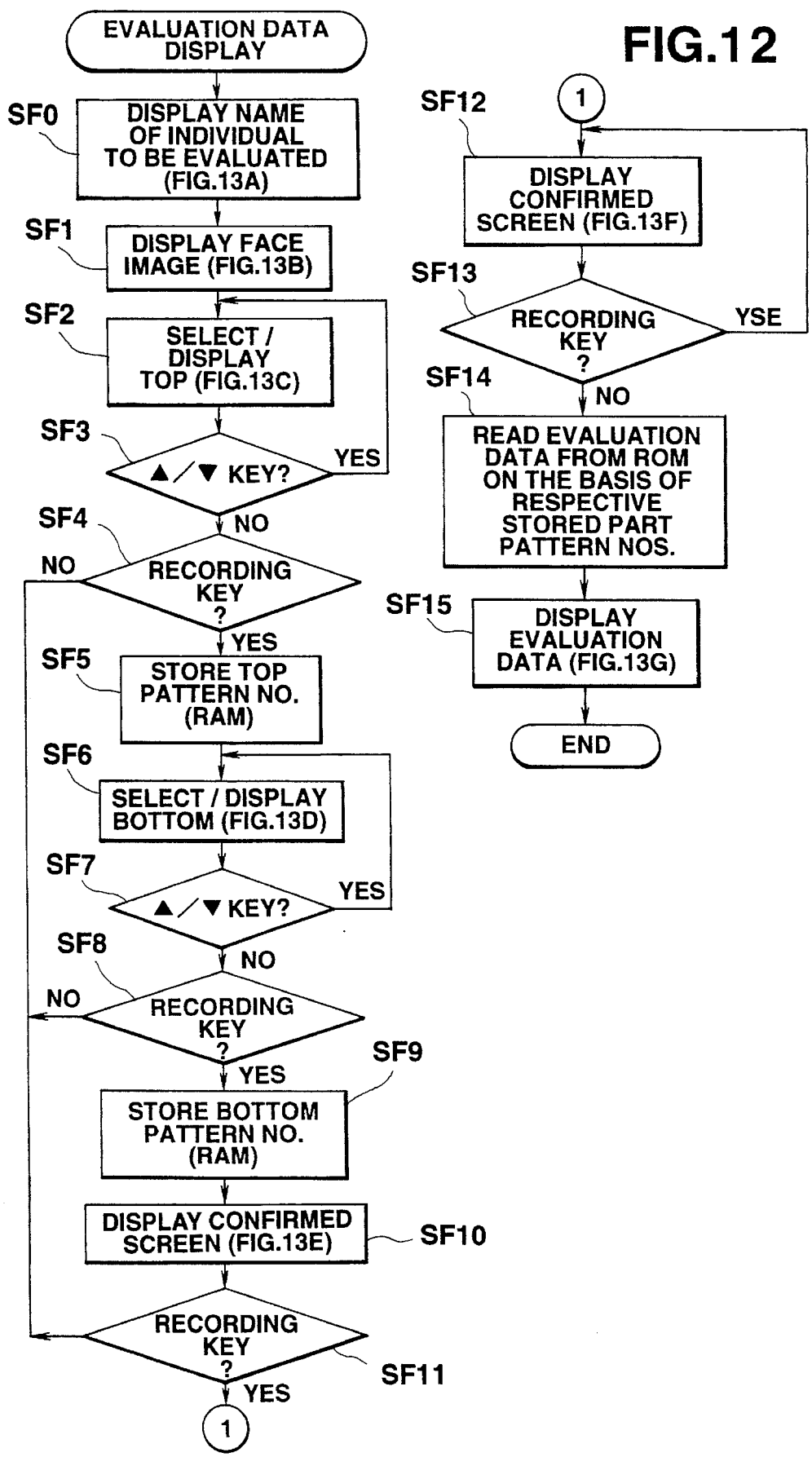
FIG. 12 is a flowchart indicative of an evaluation data display process.
Figure 13A:
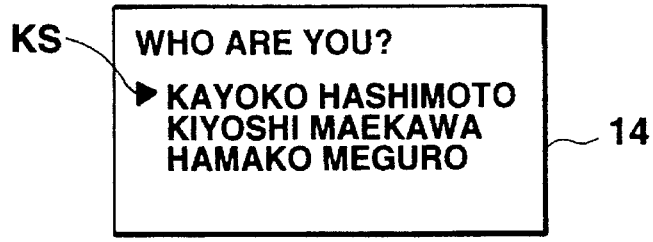
FIGS. 13A–13G show a serial of illustrative displays in the evaluation data display process.

The evaluation data display process of FIG. 12 will be described. This process is performed after the evaluation display mode display by the evaluation display mode key 20 has been operated. Thus, when the evaluation display mode is set, first, the respective names of the individuals to be evaluated are read from the individual/family data area 270 of the RAM 27 and displayed together on the display 14 as shown in FIG. 13A, and the name to be selected is designated by the cursor KS. Thus, at step SF0 it is determined whether the name of one individual to be evaluated has been selected from the respective displayed names by the operation of the name selection key 21.

Figure 13B:
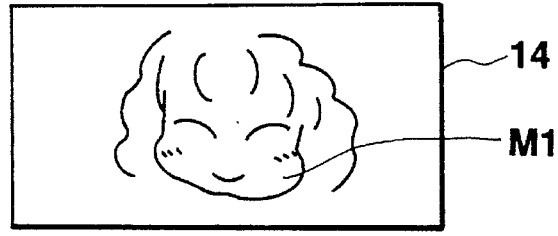

If the selected name of the individual to be evaluated is, for example, "X" and its name is "Kayoko Hashimoto", at step SF1 montage data corresponding to the "X" is read from the "X"'s montage data area 271 and the corresponding face montage image M1 is displayed on the display 14 on the basis of the read montage data. In this case, only the face one of the montage data corresponding to the selected name is read, the part patterns corresponding to the face montage data are read from the ROM 26 and synthesized in the synthesis RAM 28, and the resulting face montage image M1 is displayed, as shown in FIG. 13B.

Figure 13C:
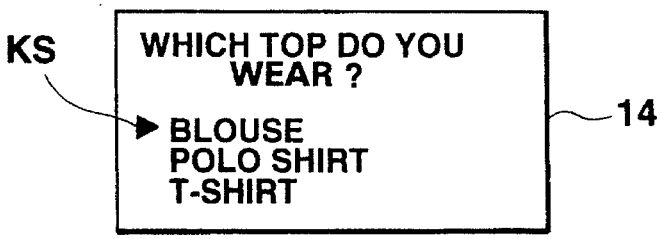

At step SF2 a top selection/display process is performed. Thus, as shown in FIG. 13C, "Which top do you wear ?", a list of tops, and the cursor KS which designates the kind of one of the tops to be selected are displayed. At step SF3 it is determined whether the user has selected the kind of one top by the operation of the cursor key 22A. In addition, at step SF4 it is determined whether the recording key 22 has been operated.

Thereafter, at step SF5 the part pattern No. corresponding to the pattern of the top indicative of the kind of the selected top is stored at the top pattern No. location in the montage data area for "X" (Kayoko Hashimoto) in the RAM 27. In this case, when the part pattern No. of any top has been stored at the top pattern No. location, it is overwritten with the part pattern No. of the selected top, and the overwritten pattern No. is stored.

Figure 13D:
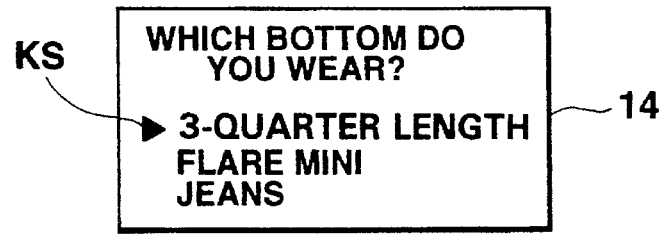

At step SF6 a bottom selecting and displaying process is performed. Thus, as shown in FIG. 13D, "Which bottom do you wear ?", a list of bottoms and the cursor KS which designates the kind of a bottom to be selected are displayed. At step SF7 it is determined whether the user has selected the kind of a bottom by the operation of the cursor key 22A. In addition, at step SF8 it is determined whether the recording key 22 has been operated.

Thereafter, at step SF9 a part pattern No. corresponding to the pattern of the bottom indicative of the kind of the selected bottom is stored at the bottom pattern location in the montage data area for "X" in the RAM 27. In this case, when the part pattern No. of any bottom has been stored at the bottom pattern location, it is overwritten with the part pattern No. of the selected bottom.

Figure 13E:
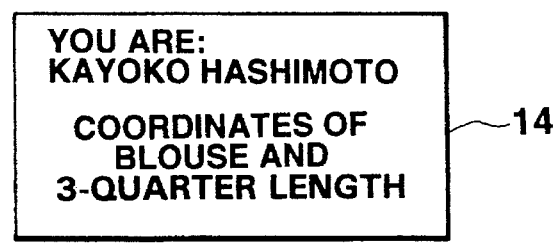
Figure 13F:
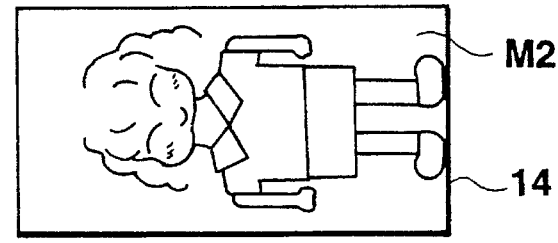

At step SF10 a confirmed screen display process is performed. As shown in FIG. 13E, a display which urges the user to confirm "You are Kayoko Hashimoto. Coordinates of a blouse and three-quarter-length" is displayed. At step SF11 it is determined whether the user has operated the recording key 22. If so, at step SF12 a whole body display process is performed (FIG. 13F).

In this process, those for the face, both arms and both legs among the part patterns corresponding to the first selected "X"'s montage data, and the top and bottom patterns corresponding to their Nos. stored in the selection of the top and bottom are read from the part pattern ROM 26. The read patterns of the face, both arms and both legs and the patterns of the top and bottom are combined in the synthesis RAM 28 to produce a synthesized montage image in the top and bottom, which image is then displayed as an "X"'s whole body montage image M2. In this case, the vertically long "X"'s whole body montage image M2 cannot be displayed upright in a horizontally long rectangular display 14. Therefore, the "X"'s whole body montage image M2 is displayed lying sideways on the horizontally long display 14.

Figure 13G:
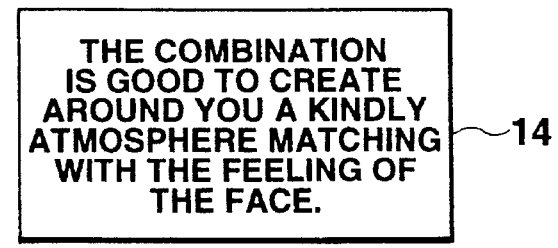

After confirmation of the "X"'s whole body displayed on the display screen, at step SF13 it is determined whether the user has operated the recording key 22. If so, at step SF14 evaluation data based on the respective stored top and bottom pattern Nos. is read from the evaluation ROM 29. In this case, since the "X" wears a "blouse" as a top (part pattern No. is "01") and a "three-quarter-length" as a bottom (part pattern No. is "01"), at step SF15 the evaluation data read from the evaluation data ROM 29 is "The combination is good to create around you a kindly atmosphere matching with the feeling of the face." and displayed as shown in FIG. 13G.

As a result, by viewing the display of the result of the evaluation, the user can rapidly and easily know whether the selected kinds of a top and a bottom (blouse and three-quarter-length) is becoming to the kind of "X"'s face (round), or what impression the kind of face and the selected kinds of the top and bottom make.

While in the first embodiment evaluation data corresponding to a combination of the top and bottom and the face montage image is displayed, evaluation data corresponding to a combination of the top and the face montage image may be displayed separately from evaluation data corresponding to a combination of the bottom and the face montage image.

While in the first embodiment the contour pattern is used as the kind of the face, both the contour and hair style patterns may be used as the kind of the face.

According to the first embodiment, only by viewing one face image displayed on the display while designating the kind of a garment corresponding to the face image, evaluation data corresponding to the combination of the displayed face image and the displayed kind of the garment is read from the evaluation data storage on the basis of the combination of the displayed face image and displayed kind of the garment, and displayed on the display. Therefore, the user can rapidly and securely know whether the impression of the face becomes the kind of the garment which the individual having that face wears or what an impression or image which a combination of the face and the kind of the garment which the individual having that face wears makes.

[Second Embodiment]

A second embodiment of the present invention will be displayed in FIGS. 14–17E. Like the evaluation data display device 10 of the first embodiment of FIG. 1, an evaluation data display device of the second embodiment includes a display/input panel 12, an input panel 13, a display 14, a key-in unit 15, a CPU 24, a display driver 25, a part pattern ROM 26, a RAM 27A, a synthesis RAM 28 and an evaluation data ROM 29A.

In the case of the second embodiment, the basic structure of the part pattern ROM 26 is the same as the part pattern ROM 26 of the first embodiment of FIG. 4 except that in the second embodiment the respective part patterns of a fatter face or a fatter body shape stored in the part pattern ROM 26 have smaller part pattern Nos.

Figure 15:
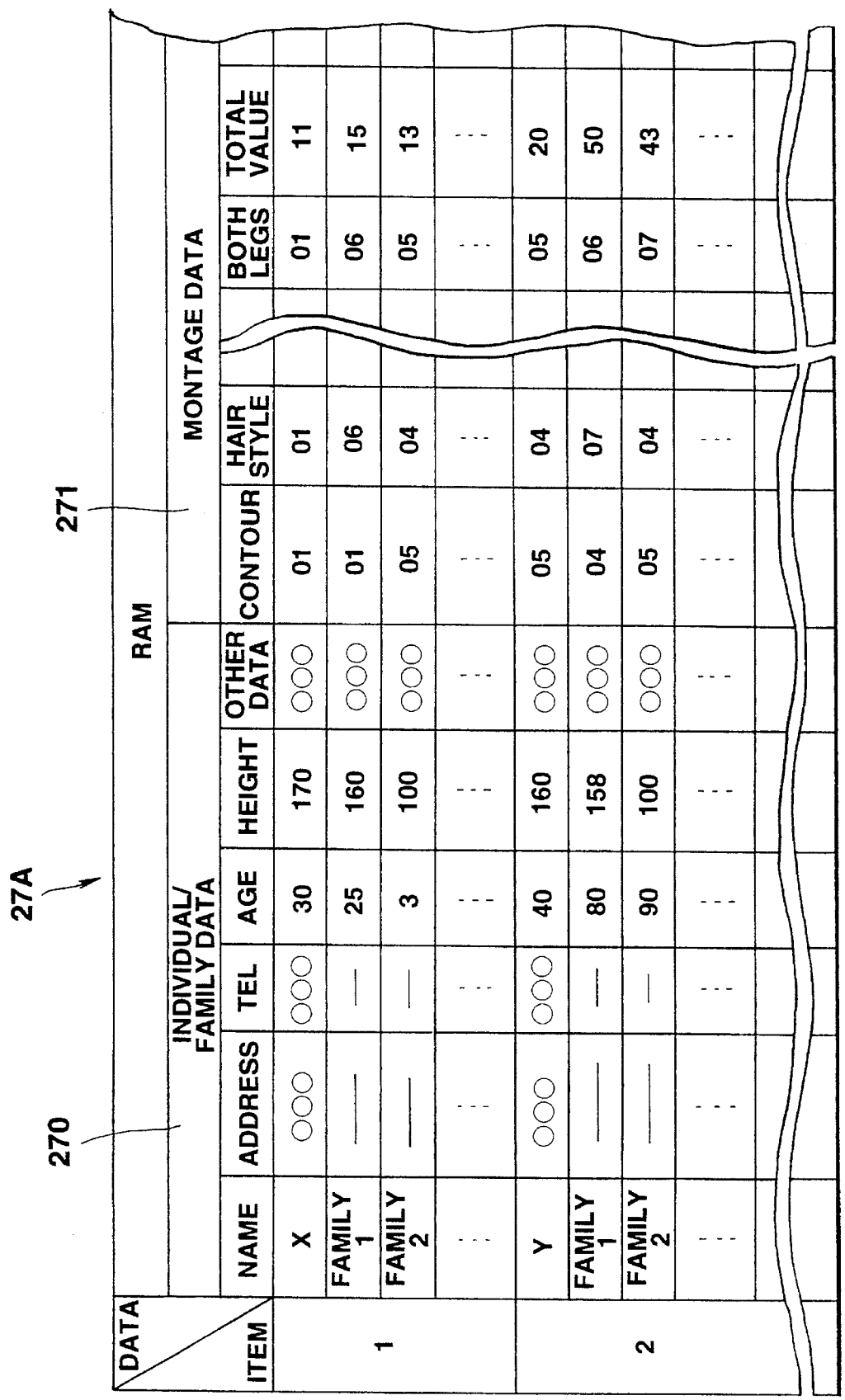
FIG. 15 shows illustrative storage contents of data in a RAM of the second embodiment.

In the case of the second embodiment, the evaluation data ROM 29A of FIG. 15 is connected to the CPU 24 in place of the evaluation data ROM 29 of the first embodiment of FIG. 5. The evaluation data ROM 29A of FIG. 15 stores data on the images of the face and body shape, data on a color which become the face and body shape, and data on advice to the user as evaluation data.

The color data and advice data of the evaluation data are described in the light of the empirical rules that, for example, a black garment becomes a round face while a white garment becomes a thin face.

In the case of the second embodiment, the RAM 27A stores the individual data, family data keyed in by the operation of the individual data input key 31 of the key-in unit 15 and montage data keyed in by the operation of the montage data input key 17 as in the RAM 27 of the first embodiment of FIG. 6, and further stores data on the total value of the part pattern Nos. corresponding to the montage data keyed in by the montage data input key 17.

The operation of the evaluation data display device of the second embodiment will be described with respect to the flowcharts of FIGS. 16 and 17. A series of processes which is the same as that (steps SA1–SA8) based on the FIG. 7 general flow of the first embodiment, an individual/family data inputting/recording process which is the same as that (steps SB2–SB12) of FIG. 8, a montage image creation/recording process which is the same as (steps SC2–SC17) of FIG. 9, and a montage retrieval/display process which is the same as that (steps SE2–SE8) of FIG. 11 are performed before the evaluation data display process of FIG. 16.

Figure 16:
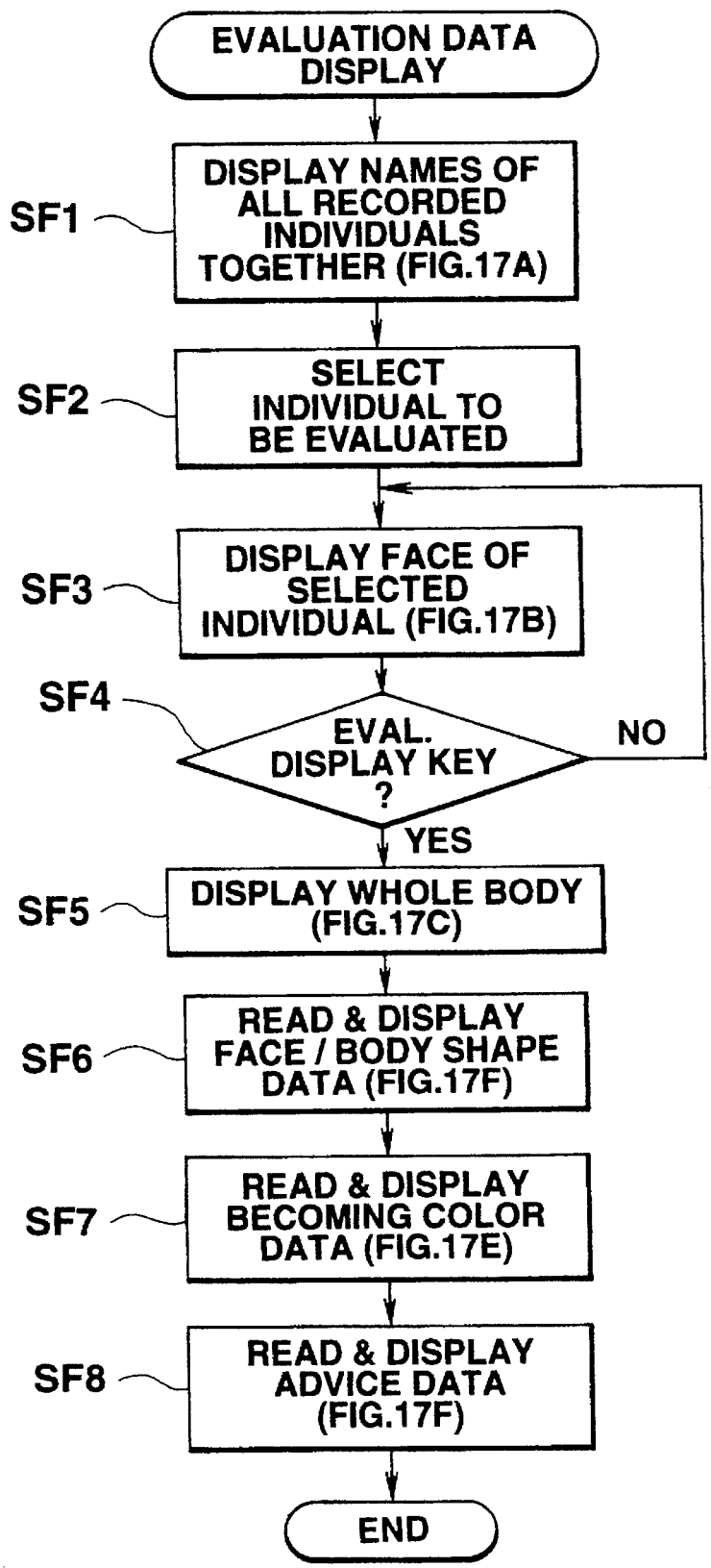
FIG. 16 is a flowchart indicative of an evaluation data display process performed in the second embodiment.

After the above respective processes have been performed, an evaluation data display process of FIG. 16 is performed, which will be described below. This process is performed after the evaluation display mode is set by the operation of the evaluation display mode key 20.

Figure 17A:
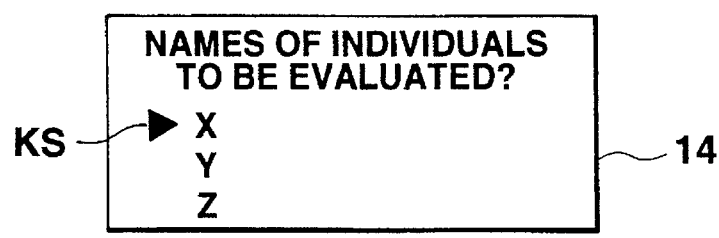
FIGS. 17A–17F show a serial of illustrative displays in the evaluation data display process performed in the second embodiment.
Figure 17B:
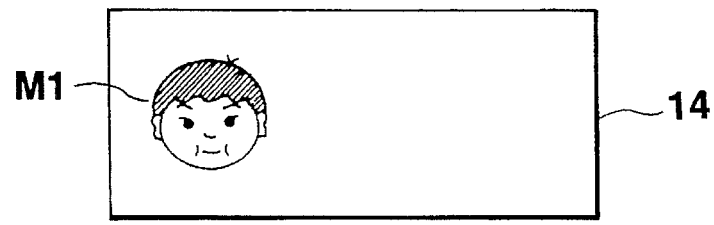

When this evaluation display mode is set, first, the names of individuals to be evaluated are read from the individual/family data area 270 of the RAM 27 and displayed along with the question "The names of individuals to be evaluated ?" on the display 14 as shown in FIG. 17A. A cursor KS which designates a name to be selected is displayed (at step SF1). The name of one individual to be actually evaluated is selected by the name selection key 21 from among the respective individuals' names displayed together (step SF2). If the selected individual to be evaluated is, for example, "X", its montage data is read from the montage data area 271 and the corresponding face montage image M1 is displayed on the display 14 on the basis of the read montage data (step SF3). In this case, only the face one of the montage data corresponding to the selected name is read and the corresponding part patterns are read from the part pattern ROM 26. Those part patterns are combined in the synthesis RAM 28 and the resulting face montage image M1 is displayed, as shown in FIG. 17B.

Figure 17C:
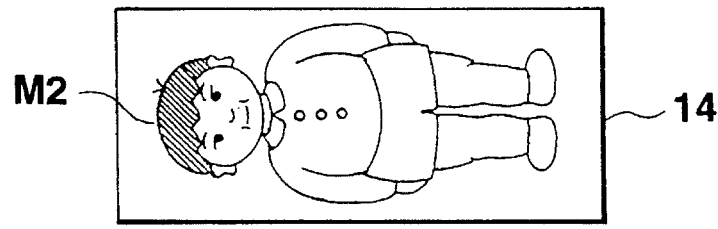

It is then determined whether the user has operated the evaluation display mode key (step SF4). If so, the selected "X"'s montage data is read from the "X"'s montage data area 271 and the corresponding whole body montage image M2 is displayed on the display 14 on the basis of the read montage data (step SF5). In this case, all the part patterns corresponding to the montage data involved in the selected name are read from the part pattern ROM 26 and combined in the synthesis RAM 28, and the resulting whole body montage image M2 is displayed, as shown in FIG. 17C. In this case, since the vertically long whole body montage image M2 cannot be displayed on the horizontally long rectangular display 14, the "X"'s whole montage image M2 is displayed lying sideways on the horizontally long rectangular display 14.

Figure 17D:
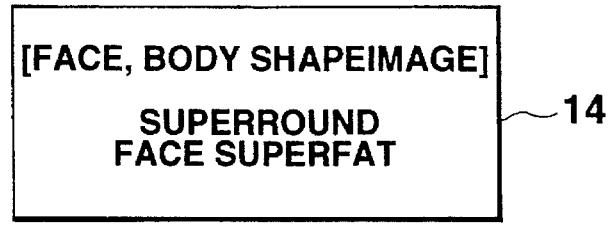

Thereafter, when a predetermined time (several seconds) has elapsed, the total value of the Nos. (in this case, "11") corresponding to the "X"'s montage data is read from the RAM 27, and the corresponding evaluation data is read from the evaluation data ROM 29. In this case, first, "superround face, superfat data" corresponding to the "face, body shape image data" is read from the evaluation data RAM 29 and displayed along with the description "face, body shape images" and "superround face, superfat", as shown in FIG. 17D (step SF6).

Figure 17E:
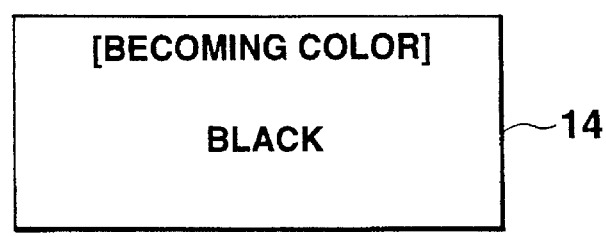

Thereafter, when a predetermined time (several seconds) has elapsed, the next evaluation data, that is, "[becoming color data]" and corresponding data "black", are read from the evaluation data ROM 29 and the description "becoming color" and "black" are displayed as shown in FIG. 17E (step SF7).

Figure 17F:
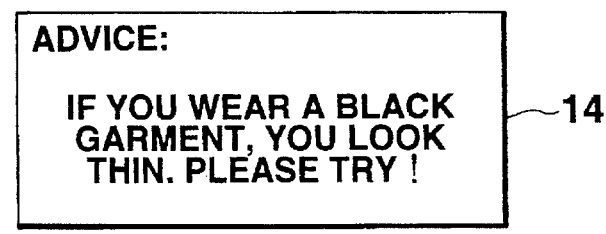

Thereafter, when a predetermined time (several seconds) has elapsed, the further next evaluation data, that is, "Advice" and the corresponding data "If you wear a black garment, you look thin. Please, try !" are read from the evaluation data ROM 29 and the description "Advice" and "If you wear a black garment, you look thin. Please, try !" are displayed as shown in FIG. 17F (step SF8).

As a result, the user can rapidly and easily know a color which is becoming to the user's face and body shape, and appropriate advice on that color.

While in the second embodiment evaluation data corresponding to at least one of part patterns which compose an object image is displayed on the basis of the at least one of part patterns, sets of an object image itself and the corresponding evaluation data may be stored and evaluation data corresponding to the selected object image may be displayed.

According to the second embodiment, evaluation data corresponding to at least one of the part patterns which compose an object image displayed on the display is read from the evaluation data storage on the basis of the at least one of the part patterns and displayed.

According to the second embodiment, evaluation data corresponding to the object image designated by the user is read from the evaluation data storage and displayed on the display. The evaluation data relates to color, for example. It involves data on an evaluated color itself or advice on the color, so that the user can rapidly and securely know evaluation on a desirable or undesirable color from the impression of the shape of an object image such as a face or whole body.

[Third Embodiment]

A third embodiment of the present invention will be described with respect to FIGS. 18–22E. Like the evaluation data display device 10 of the first embodiment of FIG. 1, an evaluation data display device of the third embodiment includes a display/input panel 12, an input panel 13, a display 14, a key-in unit 15, a CPU 24, a display driver 25, a part pattern ROM 26, a RAM 27B, a synthesis RAM 28, and evaluation data ROMs 29B and 29C.

It is to be noted that in the third embodiment the image evaluation data ROM 29B of FIG. 18 and the advice data ROM 29C of FIG. 19 are provided in place of the evaluation data ROM 29 of the first embodiment of FIG. 5.

The image evaluation data ROM 29B stores evaluation data on the degree of an image corresponding to a combination of the kind of a color (color No.) along a vertical axis and the kind of a lip (lip part pattern No.) along a horizontal axis. In this case, among evaluation data on the degree of an image, "A" implies "cute"; "B", "sporty"; "C", "elegant"; "D", "of unique personality", and numeral values appearing on the right-hand side of "A"–"D" each express the degree of the image in a range of "1"–"10". Thus, as the numeral value is larger, the degree of the image is higher.

The advice data ROM 29C stores as evaluation data in language an image corresponding to a combination of the kind of the color (color No.) along the vertical axis and the kind of a lip (lip pattern No.) along the horizontal axis. The respective data in the image evaluation data ROM 29B and the advice data ROM 29C describe in the light of empirical rules whether the kind of a face, a combination of the kind of a lip and a color of rouge are becoming to each other in combination, or what impression or image a combination of the kind of a face, the kind of a lip and the color of rouge makes.

In the case of the second embodiment, the RAM 27A stores individual/family data keyed in by the operation of the individual data input key 31 of the key-in unit 15, and montage data keyed in by the operation of the montage data input key 17 as in the RAM 27 of the first embodiment of FIG. 6, and further stores as color data the color Nos. keyed in by the operation of the cursor key 22A.

The operation of the evaluation data display device of the third embodiment will be described with respect to the flowcharts of FIGS. 21 and 22E. A series of processes which is the same as that (steps SA1-SA8) based on the FIG. 7 general flow of the first embodiment, an individual/family data input/recording process which is the same as that (steps SB2–SB12) of FIG. 8, the montage image creating/recording process which is the same as that (steps SC2–SC17) of FIG. 9, and the montage retrieval/display process which is the same as that (steps SE2–SE8) of FIG. 11 are performed before the evaluation data display process of FIG. 18.

Figure 21:
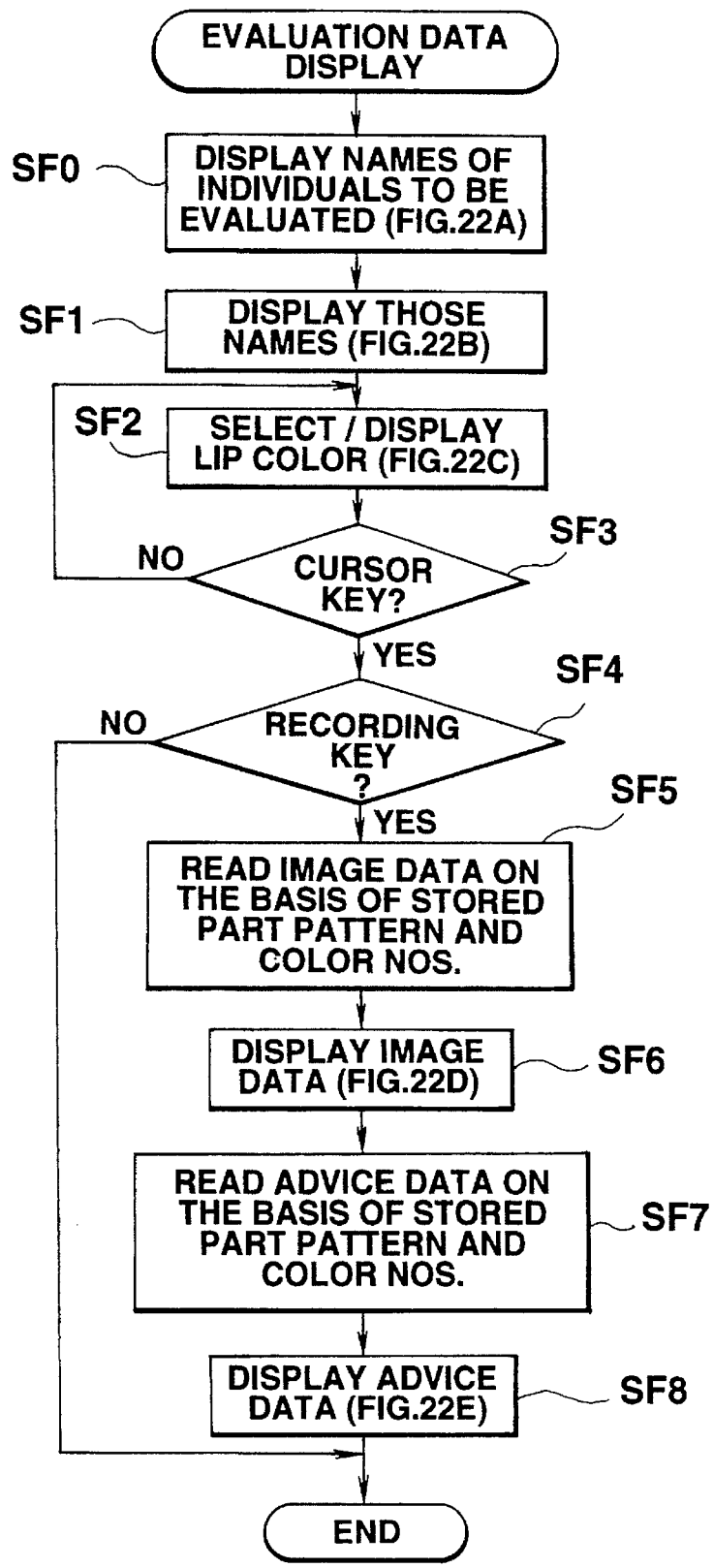
FIG. 21 is a flowchart indicative of an evaluation data display process performed in the third embodiment.

After the above respective processes have been performed, the evaluation data display process of FIG. 21 is performed, which will be described below. This process is performed after the evaluation display mode is set by the operation of the evaluation display mode key 20.

Figure 22A:
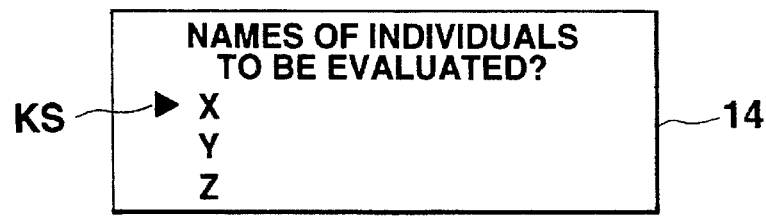
FIGS. 22A–22E show a serial of illustrative displays in the evaluation data display process performed in the third embodiment.
Figure 22B:
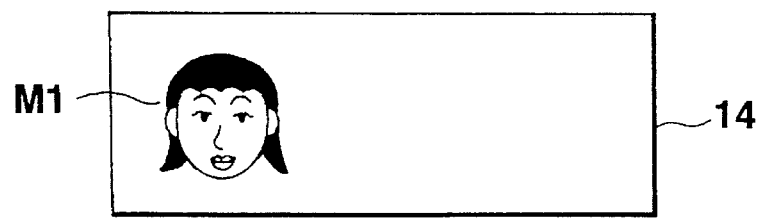

When this evaluation mode is set, first, the names of individuals to be evaluated are read from the individual/family data area 270 of the RAM 27 and displayed together along with the cursor KS which designates the name to be selected on the display 14, as shown in FIG. 22A, so that the name of one individual to be actually evaluated is selected from among the respective names displayed together (step SF10), as shown in FIG. 22A. If the selected individual to be evaluated is, for example, "X", montage data for the "X" is read from the montage data area 271 and the corresponding face montage image M1 is displayed on the display 14 on the basis of that read montage data (step SF1). In this case, only the face one of the montage data corresponding to the selected name is read and the corresponding part patterns are read from the part pattern ROM 26. The respective read part patterns are synthesized in the synthesis RAM 28 and the resulting face montage image M1 is displayed, as shown in FIG. 22B.

Figure 22C:
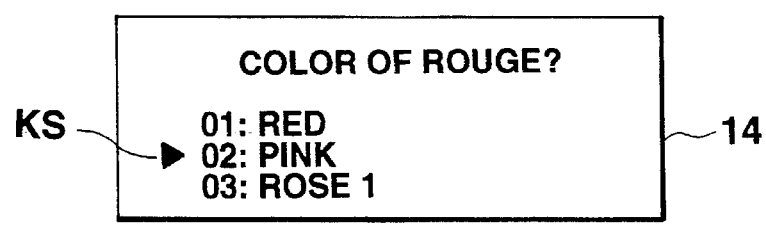

Next, the lip color selection screen display process is performed (step SF2). Thus, as shown in FIG. 22C, the question "The color of a lip ?", a list of the respective lip colors and a cursor KS which designates the kind of a lip color to be selected are displayed. The user operates the cursor key 22A to select the kind of a lip color (step SF3) and further operates the recording key 22 (step SF4). This causes the color No. indicative of the selected kind of a lip color is stored at the lip location of the "X"'s montage data area of the RAM 27.

Figure 22D:
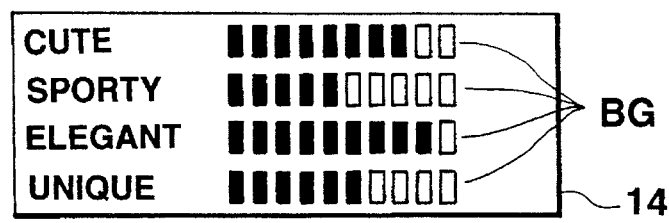
Figure 22E:
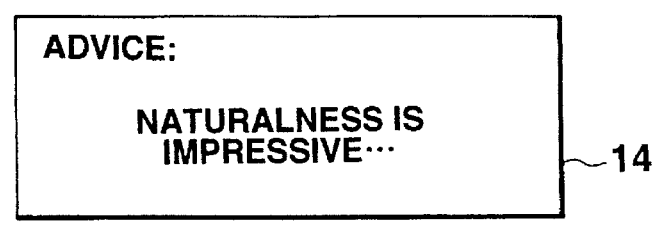

Evaluation data based on the stored lip pattern No. and the designated color No. is read from the image evaluation data ROM 29B (step SF5). In this case, the shape of the "X" lip is "round" (part pattern No. is "01"), and the lip color is "pink" (part pattern No. is "02"), so that evaluation data read from the image evaluation data ROM 29B is as shown in FIG. 22D (step SF6).

Since, in this case, image evaluation data; "8" for "A"; "5" for "B"; "9" for "C"; and "6" for "D" are read, a bar graph BG is displayed on the basis of the read numerical values, as shown in FIG. 22D.

After a lapse of a predetermined time, evaluation data is read from the advice data ROM 29C (step SF7). The evaluation data is "Naturalness is impressive" . . . , and displayed as shown in FIG. 22E (step SF8).

As a result, on the basis of the result of the evaluation, the user can rapidly and easily know whether the selected kind of the lip color (pink) becomes the kind of the "X"'s lip (round) or what impression of the selected kind of a lip color for the kind of the lip makes.

While in the embodiment evaluation data corresponding to a combination of lip's shape and color is displayed, for example, evaluation data corresponding to a combination of a contour and a lip color may be displayed separately from evaluation data corresponding to a combination of a hair style and a lip color, and so According to the third embodiment, evaluation data corresponding to a combination of at least one of the part patterns which comprise an object image displayed on the object image display and the color designated by the user is read from the evaluation data storage on the basis of a combination of at least one of the part patterns, and displayed on the display. Thus, the user can rapidly and securely know evaluation on whether the image of an object such as a face or whole body matches with a designated color in combination, or they provide a preferable combination or what impression the combination makes.

What is claimed is:

1. An evaluation data display device comprising:

first designating means for designating one of a plurality of face images;

second designating means for designating one of a plurality of garments;

evaluation data storage means for storing a plurality of evaluation data each on a combination of a face image and a garment;

reading means for reading evaluation data on a combination of the face image designated by said first designating means and the garment designated by said second designating means from said evaluation data storage means; and evaluation data display means for displaying the evaluation data read by said reading means.

2. An evaluation data display device according to claim 1, further comprising:

face image display means for displaying one face image designated by said first designating means.

3. An evaluation data display device according to claim 2, wherein said face image display means comprises:

part image storage means for storing a plurality of sets of part images, one set of part images for each of the parts of the face image;

first selecting means for selecting any part image for each of the parts from among the plurality of sets of part images stored in said part image storage means;

part image data storage means for storing a plurality of different combined data each on a combination of part images for the respective parts selected by said first selecting means;

second selecting means for sequentially selecting the plurality of different combined data stored in said part image data storage means; and display means for sequentially reading part images, corresponding to the respective parts for each of the plurality of combined data selected sequentially by said second selecting means, from said part image data storage means on the basis of the sequentially selected combined data, and sequentially displaying face images each comprising a combination of the respective read part images.

4. An evaluation data display device according to claim 1, wherein said first designating means comprises:

combined data storage means for storing a plurality of sets of combined data each comprising a combination of part data corresponding to the respective parts of a face image; and designating means for selecting one set of combined data from among the plurality of sets of combined data stored in said combined data storage means and for designating one face image corresponding to the selected set of combined data on the basis of same.

5. An evaluation data display device according to claim 1, wherein the garment designated by said second designating means comprises:

at least one of a top and a bottom.

6. An evaluation data display device comprising:

evaluation data storage means for storing a plurality of evaluation data each corresponding to an object image;

designating means for designating any one from a plurality of object images;

reading means for reading evaluation data corresponding to the object image designated by said designating means from said evaluation data storage means; and display means for displaying the evaluation data read by said reading means.

7. An evaluation data display device according to claim 6, further comprising face image display means for displaying the face image designated by said designating means.

8. An evaluation data display device according to claim 6, wherein data on the object image stored in said evaluation data storage means comprises data on at least one of a face and a body shape, and the evaluation data comprises evaluation data on a color becoming the image of the face and body shape.

9. An evaluation data display device according to claim 6, wherein data on the object image stored in said evaluation data storage means comprises data on at least one of a face and a body shape, and the evaluation data comprises advice data on the image of the face and body shape.

10. An evaluation data display device comprising:

object image storage means for storing a plurality of different object images each comprising a combination of images of the respective parts of the object images;

designating means for designating one of the plurality of different object images stored in said object image storage means;

evaluation data storage means for storing a plurality of evaluation data, one on each of the plurality of object images for that object image;

reading means for reading evaluation data corresponding to an object image designated by said designating means; and display means for displaying the evaluation data read from said reading means.

11. An evaluation data display device according to claim 10, further comprising face image display means for displaying the face image designated by said designating means.

12. An evaluation data display device according to claim 10, wherein data on the object image stored in said evaluation data storage means comprises data on at least one of a face and a body shape, and the evaluation data comprises evaluation data on a color becoming the image of the face and body shape.

13. An evaluation data display device according to claim 10, wherein the object image stored in said evaluation data storage means comprises at least one of the images of a face and a body shape, and the evaluation data comprises advice data on an impression which the images of the face and body shape makes.

14. An evaluation data display device comprising:

evaluation data storage means for storing a plurality of evaluation data each on a combination of an object image and a color;

color designating means for designating a color;

image designating means for designating an object image;

reading means for reading evaluation data corresponding to the combination of the object image designated by said image designating means and the color designated by said color designating means from said evaluation data storage means;

display means for displaying the evaluation data read by said reading means.

15. An evaluation data display device according to claim 14, further comprising object image display means for displaying the object image designated by said image designating means.

16. An evaluation data display device according to claim 14, wherein the object image stored in said evaluation data storage means comprises at least one of a face image, a part image and a body shape image, and the evaluation data on a color for the at least one of a face image, part image and body shape image.

* * * * *

UNITED STATES PATENT AND TRADEMARK OFFICE
CERTIFICATE OF CORRECTION

PATENT NO. : 5,608,852
DATED : March 4, 1997
INVENTOR(S) : HASHIMOTO et al

It is certified that error appears in the above-indentified patent and that said Letters Patent is hereby corrected as shown below:

Title page, Item [56] References Cited, under "U.S. PATENT DOCUMENTS", insert:

```
--4,539,585   9/1995   Spackova et al
  1,629,330   5/1927   H.H. Adler
  4,800,510   1/1989   Vinberg et al
  4,682,956   7/1987   Krane
  4,854,880   8/1989   Nasby--;
``` beneath "5,404,426", insert:

--OTHER PUBLICATIONS

EXPERTS AT RETAIL, Harvey P. Newquist III, DATAMATION-April 1, 1990, pages 53-56.

EXTRAORDINARY SCIENCE, COLOR & LIGHT THERAPY, Melvin D. Saunders, Jan.-March, 1992, pages 21-24.--

Signed and Sealed this

Twelfth Day of August, 1997

*Attest:*

BRUCE LEHMAN

*Attesting Officer*         *Commissioner of Patents and Trademarks*